United States Patent [19]

Takeuchi

[11] 4,437,180
[45] Mar. 13, 1984

[54] APPARATUS FOR CONTROLLING PICKUP ARM IN RECORD OR VIDEO DISK PLAYER

[75] Inventor: Atsushi Takeuchi, Hamamatsu, Japan

[73] Assignee: Nippon Gakki Seizo Kabushiki Kasiha, Hamamatsu, Japan

[21] Appl. No.: 328,517

[22] Filed: Dec. 8, 1981

[30] Foreign Application Priority Data

Dec. 24, 1980 [JP] Japan .................. 55-182140

[51] Int. Cl.³ ............... G11B 17/06; G11B 17/00
[52] U.S. Cl. .................... 369/217; 369/216; 369/221; 369/33; 369/41
[58] Field of Search .......... 369/41, 30, 33, 178, 369/221, 216, 217, 219, 220, 225, 226

[56] References Cited

U.S. PATENT DOCUMENTS

| | | | |
|---|---|---|---|
| 3,937,903 | 2/1976 | Osann, Jr. ............ | 369/33 |
| 4,106,775 | 8/1978 | Takizara ............... | 369/216 |
| 4,114,893 | 9/1978 | Leach et al. .......... | 369/41 |
| 4,134,593 | 1/1979 | Hiramatsu ............ | 369/216 |
| 4,174,891 | 11/1979 | Flint et al. ........... | 353/26 A |

FOREIGN PATENT DOCUMENTS

2062336 5/1981 United Kingdom ........ 369/41

Primary Examiner—Gerald Goldberg
Assistant Examiner—Hezron Williams
Attorney, Agent, or Firm—Spensley, Horn, Jubas & Lubitz

[57] ABSTRACT

A pickup arm controlling apparatus for an audio record or a video disk player, comprising an optical detecting device provided at the foremost end portion of a pickup arm for detecting a non-recorded groove portion, arranged so that a reproduction of the disk is performed by causing, due to the detecting device, the pickup arm to make a lead-in motion while the detecting action is being performed, and stopping the lead-in motion of the pickup arm upon detection of a predetermined non-recorded groove portion, and causing a stylus to descend onto the surface of the disk, wherein arrangement is provided so that, after the pickup arm has ceased its motion during the lead-in action, the pickup arm is forced to make a reversed run only for a trifle amount or distance to thereby compensate for an overshooting which could occur during the lead-in motion of the pickup arm. This trifle amount of the reversed run can be varied. Also, during a manual lead-in operation, the overshoot-compensating action is released.

23 Claims, 3 Drawing Figures

APPARATUS FOR CONTROLLING PICKUP ARM IN RECORD OR VIDEO DISK PLAYER

BACKGROUND OF THE INVENTION (a) Field of the Invention

The present invention concerns a pickup arm controlling apparatus for use in an automatic audio record or video disk player arranged so that, as a result of the detection of a particular portion of the groove formed on a disk which is located between adjacent pieces of signal recorded thereon or a lead-in groove (hereinafter such portion of groove will be called non-signal carrying portion of groove), a reproduction of an audio or a video signal can be performed automatically at such a desired specific portion of the groove, and the present invention features the arrangement enabling the stylus of a pickup to descend exactly onto the position at which a desired piece of signal is to be started by compensating for an overshooting of the pickup arm when it is caused to be brought to a lead-in position.

(b) Description of the Prior Art

There have been known automatic audio record or video disk players which are designed to perform the reproduction of an arbitrarily designated piece of music or image recorded on a disk. One such example utilizes the difference in intensity of the light rays reflected from the portion of groove which carries, for example, a music signal, relative to the light beam reflected from the groove carrying no signal recorded, when a beam light is irradiated onto a disk. Such conventional player, for example an audio record player, is arranged so that a photo-coupler is incorporated in a headshell to detect a non-recorded portion of the groove located immediately before a designated number of piece of music to thereby start this desired number of music. Also, another conventional arrangement utilizes similar reflection of light beam irradiated onto a disk, but this example is designed to automatically detect the specific radius of the groove at which the stylus is positioned on a disk, to thereby enable the reproduction from a lead-in groove. Any way, all of these conventional automatic audio record or video disk players are arranged so that, when a reproduction or play is to be intended, the pickup arm in its uplifted state is moved progressively toward the center of the disk supported on the turntable to detect a non-recorded portion of the groove, and that upon detection of the groove of the non-recorded portion located immediately prior to a designated piece of music or the groove of the initial non-recorded lead, a further driving of the pickup arm is suspended, and the arm is caused to descend onto the disk. However, even when the horizontal running of the pickup arm is applied with a braking force after the non-recorded portion of the groove has been detected, the pickup arm would make an unavoidable overshoot due to its inertia. Thus, the stylus will fail to descend onto the exact position for starting the desired reproduction, but will inconveniently descend onto such position which is located in the midst of the music signal-carrying or other signal-carrying groove portion. In order to prevent such inconvenience from arising, the lead-in velocity of the pickup arm has to be slowed down, which, in turn, consumes some length of time before a reproduction.

SUMMARY OF THE INVENTION

A basic object of the present invention is to provide a pickup arm controlling apparatus in an audio record disk or a video disk player, which is arranged so that, at the time of a lead-in motion of a pickup arm, a stylus can descend accurately onto the position on the disk at which the recorded or signal-carrying portion of a groove is to start.

A first object of the present invention is to provide a pickup arm controlling apparatus of the type as described above, wherein an overshooting of the pickup arm during its lead-in movement toward the center of a disk to be played is compensated for.

A second object of the present invention is to provide a pickup arm controlling apparatus of the type as described above, wherein an arrangement is made so that the amount of said overshoot compensation can be adjusted as desired.

A third object of the present invention is to provide a pickup arm controlling apparatus of the type as described above, wherein an arrangement is provided so that, at the time of the lead-in motion performed manually, said compensation is not carried out.

DETAILED DESCRIPTION OF THE PREFERRED EMBODIMENT

Figure 1:
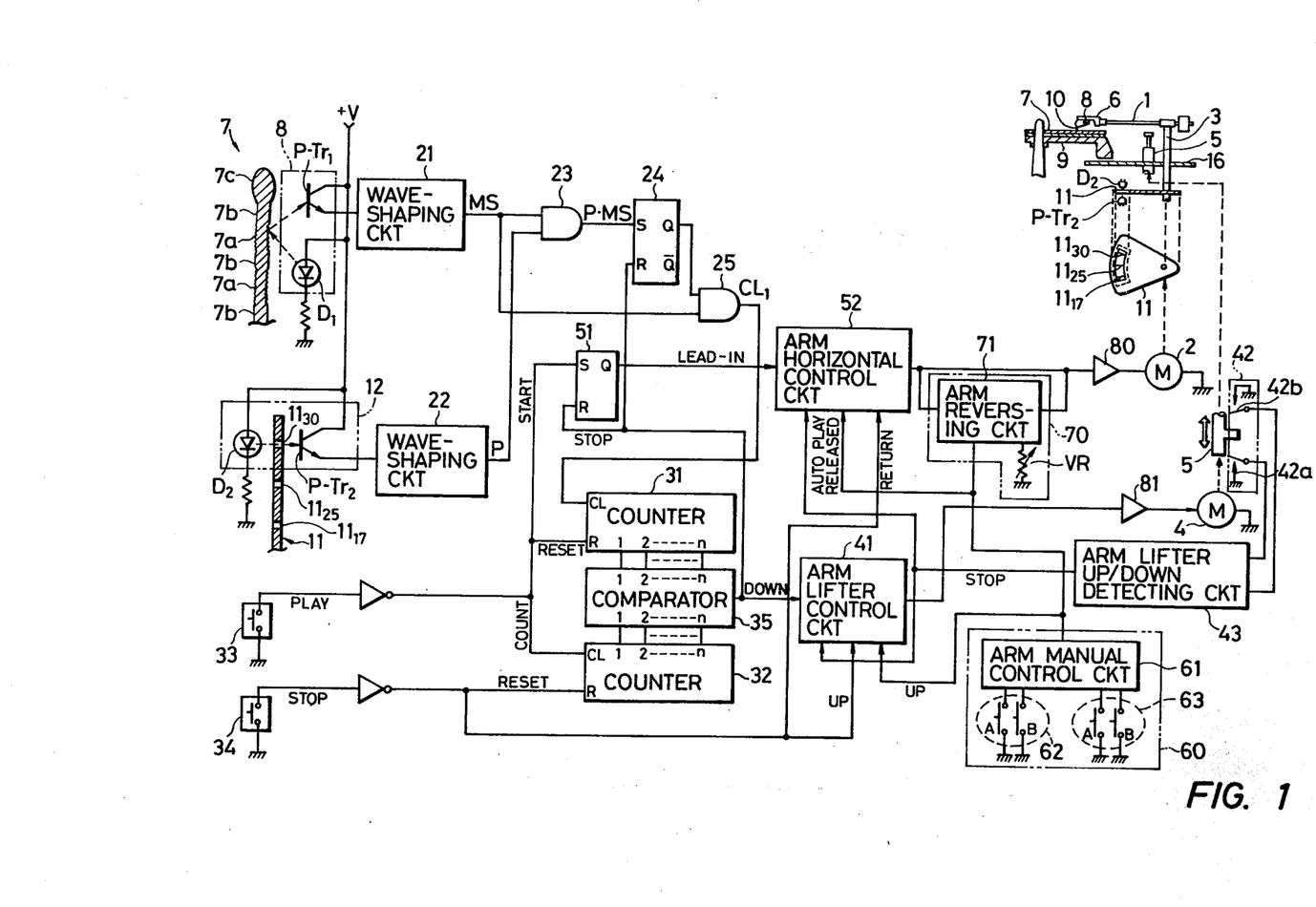
FIG. 1 is a block diagram showing an embodiment of the present invention.
Figure 3:
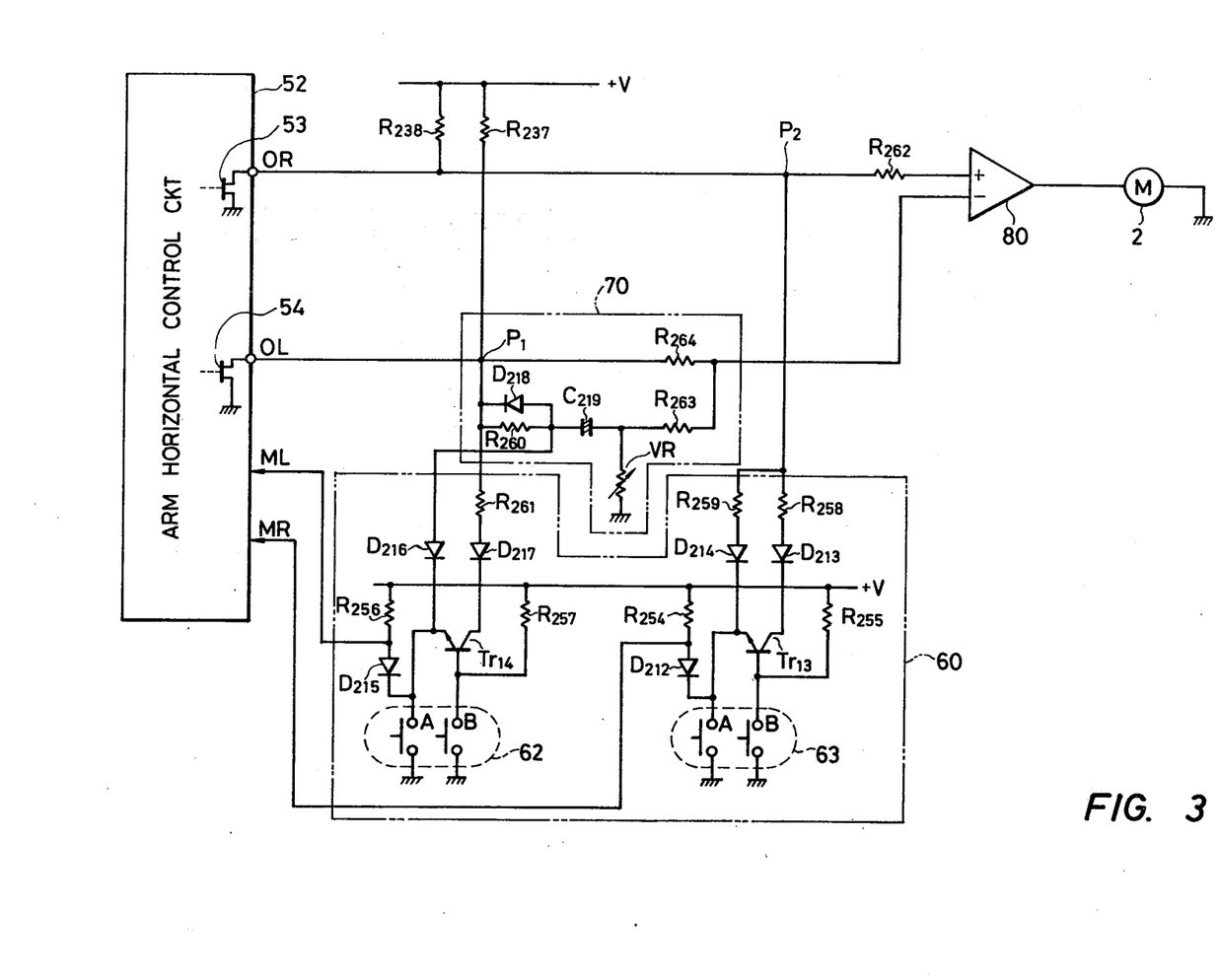
FIG. 3 is a circuit diagram showing a detailed example of the pickup arm reversing controlling section 70 and the pickup arm manual controlling section 60 in the arrangement shown in FIG. 1.

FIG. 1 shows the overall arrangement of the pickup arm controlling apparatus in an audio record disk player by way of example according to the present invention. The operation or action based on the present invention is carried out by a pickup arm reversing controlling section 70. The details of this section 70 are shown in FIG. 3 which will be described later. Here, description will be made first with respect to the mechanic arrangement thereof.

In FIG. 1, a pickup arm 1 is driven horizontally about its axis 3 by a pickup arm driving motor 2, and concurrently therewith the pickup arm 1 is driven vertically via a pickup arm lifter 5 which, in turn, is driven by a pickup arm lifter driving motor 4.

A non-recorded groove detecting section 8 is incorporated in the headshell portion 6 provided at the foremost end of the pickup arm 1 for the detection of a non-recorded groove of a disk 7. In this embodiment, an optical detection system is adopted. That is, the non-recorded groove detecting section 8 is comprised of a photo-coupler consisting of a light-emitting diode $D_1$ and a photo-transistor $P-Tr_1$ as shown on an enlarged scale on the left side of FIG. 8. According to this optical system, a beam of light emitting from the light-emitting diode $D_1$ is irradiated onto the surface of the disk 7, and the intensity of this beam of light reflected therefrom is detected by the photo-transistor $P-Tr_1$, so that the recorded portion 7a and the non-recorded portion 7b of the groove of the disk 7 can be discriminated from each other. More particularly, when the beam of light impinges onto the recorded portion 7a of the groove, this beam of light is reflected irregularly, so that the light rays incident to the photo-transistor $P-Tr_1$ are weak. As contrasted thereto, when the beam of light is caused to impinge onto the non-recorded portion of the groove, there occurs no irregular reflection of light. Therefore, the intensity of light rays incident to the photo-transistor $P-Tr_1$, becomes greater.

The pickup arm 1 has its rotary shaft 3 which, in turn, has, secured thereto, a shutter plate 11 which moves interlockingly with the rotary shaft 3. A photo-coupler is comprised of a light-emitting diode $D_2$ and a photo-transistor $P-Tr_2$, and these diode and photo-transistor are arranged to face each other via the shutter plate 11 which intervenes therebetween. The shutter plate 11 and the photo-coupler jointly constitute a pickup arm position detecting section 12, as shown on an enlarged scale on the left side of FIG. 1. This pickup arm position detecting section 12 is intended to detect the position of the pickup arm 1 corresponding to a radius of the disk used. That is, the shutter plate 11 is provided, at positions located a little inwardly toward the center of a turntable 9 for respective radii which are for example 17/2 cm, 25/2 cm and 30/2 cm from the center of the turntable 9, i.e. at lead-in groove positions corresponding to the non-recorded portion of the groove located between the groove guard and the first piece of music recorded on the disk, with slits $11_{17}$, $11_{25}$ and $11_{30}$. This arrangement insures that when a stylus 10 provided at the foremost end of the pickup arm 1 arrives at any one of the respective positions mentioned above according to the size of the record disk used on the turntable 9, the beam of light emitting from the light-emitting diode $D_2$ will pass through a respective one of the slits $11_{17}$, $11_{25}$ and $11_{30}$ as the case may be, and impinges onto the photo-transistor $P-Tr_2$. As will be described later, this pickup arm position detecting section 12 is intended to prevent the occurrence of such mishap that, owing to an erroneous detection of a groove guard portion 7c the disk 7 by the non-recorded groove portion detecting section 8, the stylus 10 descends onto the groove guard 7c and slips down therefrom to the outside of the disk 7.

Figure 2:
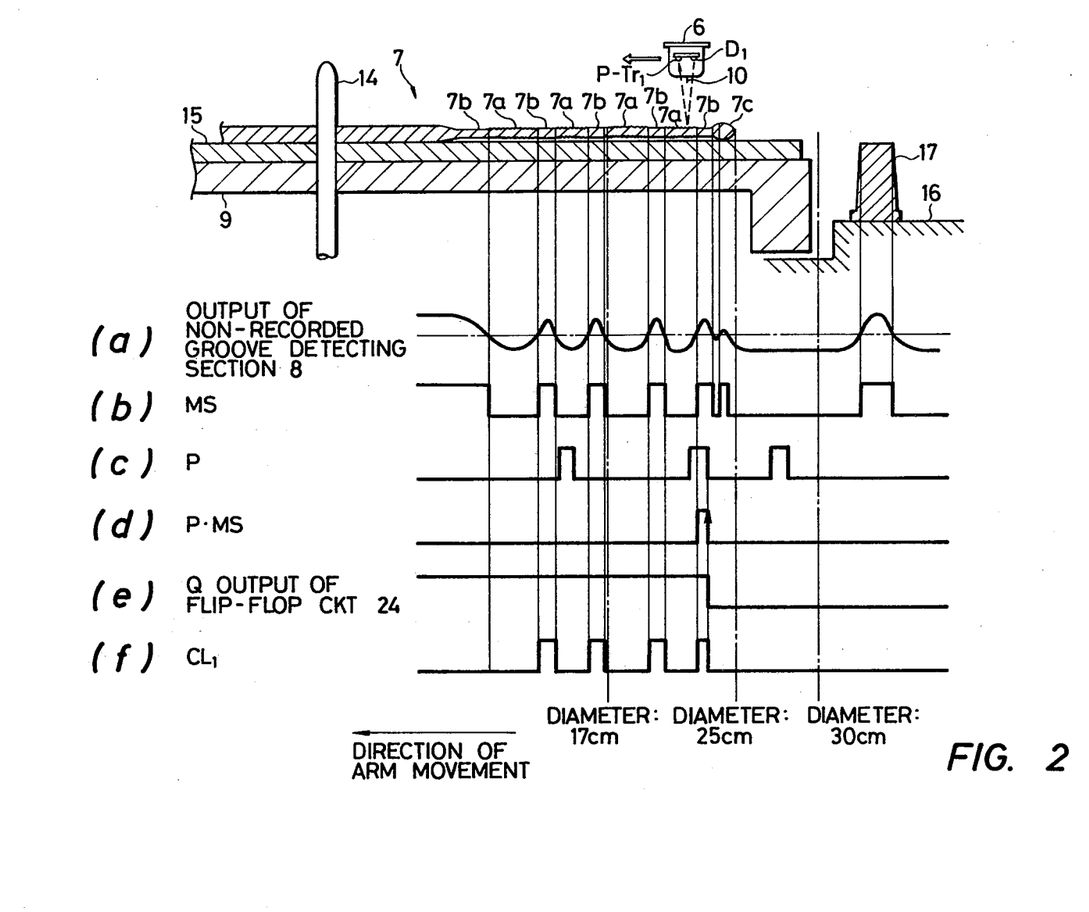
FIG. 2 is a chart for explaining the operation to detect a non-recorded portion of groove on a disk in FIG. 1.

Next, description will be made with respect to the controlling circuit section by referring also to FIG. 2 which is intended to explain the operation thereof. In FIG. 2, numeral 14 represents a center spindle, 15 a rubber mat, 16 a panel, and 17 an obstacle. The disk used in this embodiment has a diameter of 25 cm.

As shown at (a) in FIG. 2, the output of the non-recorded groove detecting section 8 is small in its level always at the recorded portion 7a of the groove, and will have a much larger value at the non-recorded portion 7b of the groove. This output signal is shaped by a wave-shaping circuit 21 into a signal MS shown at (b) in FIG. 2. Also, the output of the pickup arm position detecting section 12 is shaped by a wave-shaping circuit 22 into a signal P as shown at (c) in FIG. 2. These respective outputs MS and P of said wave-shaping circuits 21 and 22 are applied to an AND circuit 23 for taking their logic product P·MS. Whereby, the AND circuit 23 outputs a pulse P·MS when the stylus 10 is positioned right above the non-recorded portion of the groove located between the groove guard 7c and the first piece of music of the disk 7 as shown at (d) of FIG. 2.

The output P·MS of the AND circuit 23 sets a flip-flop circuit 24 at the onset of build-up of this output. An AND circuit 25 takes the logic product of the Q output (shown at (e) in FIG. 2) of the flip-flop circuit 24 and the output MS of the wave-shaping circuit 21. Whereby, there is derived from the AND circuit 25 a signal $CL_1$ (shown at (f) in FIG. 2) which corresponds exactly to the non-recorded portion 7b of the groove of the disk 7 without being affected by the groove guard 7c nor by the obstacle 17.

A counter 31 is assigned to detect as to on which number of piece of music the stylus 10 is positioned, by counting said signal $CL_1$. Also, a counter 32 is provided to memorize a designated number of music piece recorded. In this embodiment, the designation of the number of music piece is performed by the number of depressions of a play button 33 which is the button to be depressed when a play or reproduction is intended. It should be noted here that the counters 31 and 32 are each arranged to be initialized into their reset state interlockingly with the respective manipulation of the play button 33 and a stop button 34 which is intended for stopping the play or reproduction. A comparator 35 is provided to compare the values of counts of these counters 31 and 32, and when these count values are in agreement, i.e. when the stylus 10 is positioned right above the non-recorded portion of the groove located immediately before the designated piece of music, the comparator 35 outputs an agreement signal.

A pickup arm lifter controlling circuit 41 is intended to control the pickup arm lifter driving motor 4. That is, when an agreement signal is outputted from the comparator 35, this lifter controlling circuit 41 causes the pickup arm lifter 5 to descend via an amplifier 81, and also acts to cause this lifter 5 to ascend when the stop button 34 is depressed. The pickup arm lifter 5 is provided with a limit switch 42, so that this switch is arranged that, when the ascension and descent of the pickup arm lifter 5 have gained predetermined respective vertical limit altitudes, switch elements 42a and 42b of the switch 42 are actuated, respectively. A pickup arm lifter up/down limit detecting circuit 43 performs the detection of the actuation of said limit switch 42 and brings the pickup arm lifter driving motor 4 to a halt via the pickup arm lifter controlling circuit 41.

A flip-flop circuit 51 is assigned to designate the interval of driving of the pickup arm 1. More particularly, this flip-flop circuit 51 is set when the play button 33 is depressed, so that its Q output assumes a high level. When the agreement signal is outputted from the comparator 35, the flip-flop circuit 51 is reset. Said interval in which the Q output remains to be at the high level does represent the very interval throughout which the pickup arm 1 is to be driven.

A pickup arm horizontal controlling circuit 52 is intended to control the pickup arm driving motor 2. That is, in the interval in which the Q output of the flip-flop circuit 51 has risen to the high level and under the condition that the pickup arm 1 is at its uplifted position in accordance with the output of the pickup arm up/down limit detecting circuit 43, the horizontal controlling circuit 52 of the pickup arm drives the pickup arm driving motor 2 via an amplifier 80 to start a lead-in motion of the pickup arm 1 toward the center of the turntable 9. Also, under the condition that when the stop button 34 is depressed and the pickup arm 1 is at its uplifted position, the horizontal controlling circuit 52 causes a returning movement of the pickup arm 1.

The pickup arm reversing controlling section 70 is one which constitutes an essential portion of the present invention. A pickup arm reversing controlling circuit 71 is arranged to operate so that, when there is a cease of the output from the horizontal controlling circuit 52 commanding a lead-in motion, this circuit 71 applies to the pickup arm driving motor 2 such voltage as will cause a motion of the pickup arm 1 in a direction opposite to that intended by the lead-in command signal, lasting only for a trifle length of time corresponding to the amount of overshooting. Whereby, the pickup arm 1 is brought back in the reverse direction, and thus the overshooting is compensated for, and the stylus 10 is positioned precisely above the non-recorded portion of the groove located immediately before the designated piece of music. A reversing amount adjusting variable resistor VR is intended to adjust the amount of the reversed run of the pickup arm 1.

A pickup arm manual controlling section 60 is intended to manually drive the pickup arm 1. Pickup arm manual switches 62 and 63 are for leftward feeding and rightward feeding of the pickup arm 1. These switches 62 and 63 are each constructed in the form of a two-step action switch. In the first step mode, a contact A for slow feeding is actuated, and in the second step mode, the contact A as well as a contact B which is for quick feeding are both actuated. A pickup arm manual controlling circuit 61 drives, based on the operation of the switches 62 and 63, the pickup arm driving motor 2 in manual mode via the pickup arm horizontal controlling circuit 52. It should be noted here that so long as the manual mode operation continues, the automatic playing due to the output of the flip-flop circuit 51 and the operation of the pickup arm reversing controlling section 70 both cease. Also, the pickup arm lifter controlling circuit 41 is so controlled as to render the pickup arm lifter 5 to its uplifted state.

Next, description will be made of a detailed example of the pickup arm reversing controlling section 70 and the pickup arm manual controlling section 60 by referring to FIG. 3.

In FIG. 3, field effect transistors (hereinafter referred to as FET or FET's) 53 and 54 are provided at the output terminals of the pickup arm horizontal controlling circuit 52. The FET 53 is for rightward feeding (returning), and the FET 54 is for leftward feeding (leading-in). A rightward feeding output OR and a leftward feeding output OL are applied respectively to the amplifier 80 being comprised of a differential amplifier. A pickup arm returning action is carried out when a positive voltage is applied to the pickup arm driving motor 2 under the condition that a voltage $+V$ is applied to the non-inverting input terminal of the differential amplifier 80 as the FET 53 is rendered non-conductive, and the inverting input terminal of the differential amplifier 80 is grounded as the FET 54 is rendered conductive. A leftward feeding is carried out when a negative voltage $-V$ is applied to the pickup arm driving motor 2 based on the condition that the non-inverting input terminal of the differential amplifier 80 is grounded as the FET 53 is rendered conductive, and, concurrently therewith a voltage $+V$ is applied to the inverting input terminal thereof as the FET 54 is rendered non-conductive.

A reversed run of the pickup arm 1 by the pickup arm reversing controlling section 70 is carried out, in this example, by utilizing the discharge of a capacitor. Also, arrangement is provided so that the amount of the reversed run of the pickup arm 1 is adjusted by adjusting the discharge time constant of such capacitor. More particularly, in the pickup arm reversing controlling section 70, the point indicated at $P_1$ is grounded via a resistor $R_{260}$, a capacitor $C_{219}$ and the variable resistor VR which is for adjusting the amount of reversed run. Whereby, at the time of a lead-in operation, i.e. when the FET 54 is non-conductive, the capacitor $C_{219}$ is charged up via resistors $R_{237}$ and $R_{260}$ and via the reversing amount adjusting variable resistor VR. When the pickup arm 1 is led in to a designated position, the FET 54 is rendered conductive. Whereby, the driving of the pickup arm 1 is suspended. Concurrently therewith, the electric charge stored in the capacitor $C_{219}$ is discharged via a diode $D_{218}$ and the FET 54 and via the reversing amount adjusting variable resistor VR. Whereupon, a differentiated negative voltage is generated at the terminal of said variable resistor VR. Accordingly, this negative voltage is applied to the pickup arm driving motor 2 via the differential amplifier 80, and the pickup arm 1 is driven toward an opposite direction (in the drawing, to the rightward direction), only for a trifle distance. Thus, the overshooting of the pickup arm 1 at the time of the lead-in action is compensated for, and the stylus 10 is positioned exactly above the non-recorded portion of the groove located immediately before the designated piece of music. The amount of the reversed run is determined by a time constant which, in turn, is determined by the capacitor $C_{219}$ and the reversing amount adjusting variable resistor VR, and further by an input resistor $R_{263}$ of the differential amplifier 80. By operating the reversing amount adjusting variable resistor VR, it is possible to adjust the amount of reversed run to an appropriate length.

In FIG. 3, the point $P_1$ is arranged to be grounded via a parallel connection of a series circuit which is comprised of a resistor $R_{261}$, a diode $D_{217}$ and a transistor $Tr_{14}$ and a series circuit comprised of a resistor $R_{260}$ and a diode $D_{216}$; and via the terminal A of the manual leftward feed switch 62. The base of the transistor $Tr_{14}$ is connected to the power supply $+V$ via a base resistor $R_{257}$, and also it is grounded via the terminal B of the manual leftward feed switch 62. Also, a circuit which leads from a resistor $R_{256}$ and goes through a diode $D_{215}$ to the terminal A of the manual leftward feed switch 62 is connected to the power supply $+V$. This latter circuit is one intended to detect the fact that a manual leftward feeding operation has been performed. This circuit delivers, to the pickup arm horizontal controlling circuit 52, a voltage derived at the mutual connecting point of the resistor $R_{256}$ and the diode $D_{215}$, to serve as a manual leftward feed command signal ML. The pickup arm horizontal controlling circuit 52, upon its receipt of said manual leftward feed command signal ML, turns the FET 53 conductive and the FET 54 non-conductive to create the condition ready for a manual leftward feed action to be started.

By virtue of the above-stated arrangement, it will be understood that, during the period in which the manual leftward feed switch 62 is not operated, the point $P_1$ is not grounded through this manual leftward feed switch 62. Thus, at this point $P_1$ is derived a voltage of either 0 (zero) or $+V$ depending on the "on" or "off" of the FET 54, respectively, due to the automatized operation.

When the manual leftward feed switch 62 is operated to enter into the abovesaid first step mode operation, the terminal A is activated, and accordingly the voltage at the mutually connected point of the resistor $R_{256}$ and the diode $D_{215}$ drops. This lowered voltage serves as a manual leftward feed command signal, so that the FET 53 is rendered conductive, and the FET 54 is rendered non-conductive. The transistor $TR_{14}$ is rendered conductive in accordance with the activation of the terminal A, and the voltage at the point $P_1$ will become the voltage obtained by dividing the voltage $+V$ by the parallel resistance consisting of the resistors $R_{260}$ and $R_{261}$, and the resistor $R_{237}$. This divided voltage is applied, via a resistor $R_{264}$, to the inverting input terminal of the differential amplifier 80. At such time, the FET 53 is in its conductive state, so that there is no input applied at the non-inverting input terminal of the differential amplifier 80. Accordingly, the pickup arm 1 is fed leftwardly. However, owing to the fact that the voltage at the point $P_1$ at such moment is lower than $+V$, the speed of the leftward feeding at such time is lower as compared with the instance of automatic operation mode. It should be noted here that, in such instance, the diode $D_{216}$ is grounded also, so that the capacitor $C_{219}$ is not charged up. Accordingly, by subsequently rendering the manual leftward feed switch "off", no discharge of the capacitor $C_{219}$ is performed even when the FET 54 is rendered conductive, and accordingly there arises no reversed run of the pickup arm 1 contrary to the automatic operation mode in which a reversed run of the pickup arm 1 takes place.

When the manual leftward feed switch 62 is operated further, and when, thus, said second mode step is assumed, both the terminal A and the terminal B are activated. Whereby, the transistor $Tr_{14}$ is rendered non-conductive, and the point $P_1$ will be at a potential which is obtained by dividing the voltage $+V$ by the resistor $R_{237}$ and the resistor $R_{260}$. This divided potential is applied, via a resistor $R_{264}$, to the inverting input terminal of the differential amplifier 80, so that the pickup arm 1 is fed leftwardly. At such instance, the resistance value of the resistor $R_{260}$ is greater than the resistance value of the parallel resistors $R_{260}$ and $R_{261}$. Therefore, the voltage at the point $P_1$ of the horizontal controlling circuit 70 becomes higher than that at the time of the first step mode operation, and the leftward feeding of the pickup arm 1 is carried out at a speed greater than that at the first step mode operation.

In FIG. 3, a point $P_2$ is arranged so that it is grounded via circuit consisting of a parallel connection of a series circuit comprising a resistor $R_{258}$, a diode $D_{213}$ and a transistor $Tr_{13}$ and a series circuit comprising a resistor $R_{259}$ and a diode $D_{214}$, and via the terminal A of the manual rightward feed switch 63. The base of the transistor $Tr_{13}$ is connected via a resistor $R_{255}$ to the power supply $+V$, and further is grounded through the terminal B of the manual rightward feed switch 63. Also, the circuit leading from a resistor $R_{254}$ to the terminal A of the manual rightward feed switch 63 via a diode $D_{212}$ is connected to the power supply $+V$. This circuit is assigned to make a detection of the fact that the manual rightward feeding operation has been effected, and delivers, to the pickup arm horizontal controlling circuit 52, a voltage at the connecting point of the resistor $R_{254}$ and the diode $D_{212}$ as a manual rightward feed command signal MR. Upon receipt of this manual rightward feed command signal MR, the pickup arm horizontal controlling circuit 52 renders the FET 53 non-conductive and the FET 54 conductive to create the condition ready for starting a manual rightward feeding operation.

With the above-stated arrangement, it will be noted that, when the manual rightward feed switch 63 is not actuated, the point $P_2$ is not grounded through the manual rightward feed switch 63. Thus, there appears at said point $P_2$ a voltage of either 0 (zero) or $+V$ in accordance with the conductive or non-conductive state of the FET 53, respectively, due to the automatized operation.

When the manual rightward feed switch 63 is operated and when, thus, said first step mode operation is assumed, the terminal A is activated, whereby the voltage at the connecting point of the resistor $R_{254}$ and the diode $D_{212}$ drops, and this lowered voltage serves as a manual rightward feed command signal and renders the FET 53 non-conductive and the FET 54 conductive. The transistor $Tr_{13}$ is rendered conductive as a result of the activation of the terminal A, and the voltage at the point $P_2$ will assume a level reached by dividing the voltage $+V$ by a resistor $R_{238}$ and the resistors $R_{258}$, $R_{259}$. This divided voltage is applied via a resistor $R_{262}$ to the non-inverting input terminal of the differential amplifier 80. At such moment, the FET 54 is not in its conductive state, so that the inverting input terminal of the differential amplifier 80 is at zero potential. Accordingly, the pickup arm 1 is fed rightwardly. However, since at such time the potential at the point $P_2$ is lower than $+V$, the rightward feeding is performed at a low speed as compared with the automatic operation mode.

When the manual rightward feed switch 63 is operated further and when, thus, said second step mode operation is assumed, both the terminals A and B are activated. Whereby, the transistor $Tr_{13}$ is rendered non-conductive, and the voltage at the point $P_2$ will assume a level which is brought about by dividing the voltage $+V$ by the resistor $R_{238}$ and the resistor $R_{259}$, and this divided voltage is applied via the resistor $R_{262}$ to the non-inverting input terminal of the differential amplifier 80. At such instance, the resistance value of the resistor $R_{259}$ is greater than the resistance value of the parallel resistors $R_{259}$ and $R_{258}$. Accordingly, the rightward feeding is effected at a speed greater than that in the first step mode operation.

By arranging the pickup arm reversing controlling section 70 and the pickup arm manual controlling section 60 in the manner as shown in FIG. 3, it is possible to release the automatic mode operation when it is intended to enter into a manual mode operation, and also to release the reversed-run operation.

Finally, a brief explanation will be made hereunder with respect to each of a series of operations or actions in the automatic mode operation and the manual mode operation.

1. Automatic mode operation

In case it is intended to perform an automatic operation, the first step is to depress the play button 33 only such number of times as corresponding to the designated number of piece of music recorded on the disk. This number of depressions is stored in the counter 32. Also, the depressing operation of the play button 33 causes the counter 31 to be initialized to its reset state, and also sets the flip-flop circuit 51. The pickup arm horizontal controlling circuit 52 will drive the pickup arm driving motor 2 under the condition that the pickup arm lifter 5 is in its uplifted position based on the Q output of the flip-flop circuit 51 which output has become high level, and whereby the pickup arm 1 is brought to the lead-in motion.

In the lead-in step, it will be noted that, on the basis of the detection performed by the non-recorded groove detecting section 8 and by the pickup arm position detecting section 12, there are outputted successively pulse signals $CL_1$ from the AND circuit 25 at a position exactly corresponding to the non-recorded portion $7b$ of groove of the disk 7. These pulse signals $CL_1$ are counted by the counter 31.

When the count value of the counter 31 is in agreement with the designated number of piece of music stored in the counter 32, the flip-flop circuit 51 is reset, and accordingly the driving of the pickup arm 1 is suspended. At such instance, the pickup arm 1 will overshoot owing to its inertia. However, owing to the action of the pickup arm reversing controlling section 70, the pickup arm 1 is brought backward for a trifle distance, and is positioned accurately above the non-recorded portion of the groove located immediately before the designated number of piece of music. Then, the pickup arm lifter driving motor 4 is driven by the pickup arm lifter controlling circuit 41, so that the pickup arm lifter 5 is caused to descend until it activates the limit switch 42a. Whereby, the stylus 10 is caused to descend toward the groove of the disk 7, and the reproduction of the designated number of piece of music is carried out.

When it is intended to terminate the reproduction or play of the music, it is only necessary to depress the stop button 34. Whereupon, the pickup arm lifter controlling circuit 41 receives an "up" command signal from the stop button 34, and drives the pickup arm lifter driving motor 4 in a reverse direction. As a result, the pickup arm lifter 5 will be caused to ascend until it activates the limit switch 42b. Thereafter, the pickup arm horizontal controlling circuit 52 drives the pickup arm driving motor 2 in a direction opposite to that for the lead-in motion, and returns the pickup arm 1 toward the pickup arm rest (not shown). At such moment, the counter 32 is initialized to its reset state, and is rendered to a state ready for the user to designate a desired number of piece of music.

2. Manual mode operation

Upon operation of either the switch 62 or the switch 63 of the pickup arm manual controlling section 60, the pickup arm horizontal controlling circuit 52 releases the automatic operation mode, so that the pickup arm 1 will move in accordance with the operation of the switch 62 or the switch 63. Thereafter, even when the switch 62 or 63 is deactivated, a reversed run of the pickup arm 1 is not carried out since the operation of the pickup arm reversing controlling section 70 has been deactivated. Thus, the pickup arm 1 is positioned at a location as intended by the manual operation.

What is claimed is:

1. A pickup arm controlling apparatus for an audio record or a video disk player, comprising:

lead-in position detecting means for detecting a non-recorded portion of a disk onto which a stylus is to descend during a movement of a pickup arm toward the center of said disk;

reproduction-start operating means for providing an operating signal;

pickup arm horizontal controlling means for outputting a lead-in command signal in response to the receipt of an operating signal from the reproduction-start operating means, said lead-in command signal being ceased to be outputted upon receipt of a detection signal from said lead-in position detecting means;

pickup arm lifter controlling means for causing a pickup arm lifter to descend from an uplifted position to a lowered position upon receipt of said detection signal from said lead-in position detecting means to thereby lower said stylus onto said disk;

pickup arm reversing controlling means for outputting, for a preset length of time after a cease of said lead-in command signal delivered from said pickup arm horizontal controlling means, a pickup arm reversing command signal; and pickup arm horizontal driving means for horizontally driving said pickup arm in a first direction upon receipt of an output from said pickup arm horizontal controlling means and in the opposite direction upon receipt of an output from said pickup arm reversing controlling means, wherein said preset length of time corresponds to the amount of time necessary to drive the pickup arm in the opposite direction to compensate for the pickup arm overrunning said non-recorded portion on the disk after the cessation of the lead-in command signal.

2. A pickup arm controlling apparatus according to claim 1, wherein: said lead-in position detecting means comprises:

non-recorded portion detecting means for detecting a non-recorded portion of the disk during a movement of the pickup arm toward the center of said disk;

lead-in position setting means preliminarily set with a position for causing a lead-in motion; and comparing means for comparing a signal indicating a position set by said lead-in position setting means with a detection signal delivered from said non-recorded portion detecting means, to thereby output a controlling signal to said pickup arm horizontal controlling means.

3. A pickup arm controlling apparatus according to claim 2, wherein:

said non-recorded portion detecting means includes an outermost non-recorded portion detecting means which detects an outermost non-recorded portion of the disk based on signals delivered from a first optical detecting means assigned for detecting a reflection light of a beam of light impinging onto a surface of the disk and also from a second optical detecting means assigned for detecting positions corresponding to respective disk sizes; and said lead-in position setting means is preliminarily set with a position located at an outermost non-recorded portion of the disk.

4. A pickup arm controlling apparatus according to claim 3, wherein:

said non-recorded portion detecting means is arranged so that a non-recorded portion of the disk located between a recorded portion and its adjacent another recorded portion is detected by said first optical detecting means; and said lead-in position setting means sets said outermost non-recorded portion of the disk and also sets sequential numbers of non-recorded portions located between respective recorded portions and their adjacent recorded groove portions, starting at an outermost-located non-recorded portion toward inner-located non-recorded portions.

5. A pickup arm controlling apparatus according to claim 3, wherein:

said first optical detecting means is provided near the stylus of the pickup arm and is comprised of a light-emitting device capable of emitting a light and a light-receiving device capable of receiving a reflection light of a beam of light emitting from said light-emitting device; and said second optical detecting means is provided with a shutter plate having slits formed at such sites corresponding to respective sizes of disks and being movable interlockingly with a movement of said pickup arm, and with a light-emitting device provided fixedly on one side of said shutter plate and a light-receiving device provided fixedly on the other side of said shutter plate for receiving a beam of light emitting from said light-emitting device through one of said slits, to thereby detect a specific one of the slits.

6. A pickup arm controlling apparatus according to claim 4, in which: said non-recorded portion detecting means comprises:
- a first gate means for receiving detection signals from said first and second optical detecting means to output an outermost non-recorded portion detection signal;
- flip-flop means for being set upon its receipt of said outermost non-recorded portion detection signal, and for being reset upon its receipt of an output from said comparing means;
- a second gate means for being opened upon its receipt of a setting output from said flip-flop means to allow passage therethrough of an output delivered from said first optical detecting means; and
- a first counter means for counting non-recorded portion detection signals outputted from said second gate means and for holding the counts.

7. A pickup arm controlling apparatus according to claim 6, wherein:
- said lead-in position setting means comprises a second counter means for taking lead-in position setting data;
- said comparing means is comprised of a comparator for comparing contents of said first counter means with contents of said second counter means to thereby output a signal when both counts are in agreement.

8. A pickup arm controlling apparatus according to claim 3, including:
- waveshaping means for providing pulsed waveshapes as a function of outputs from said first optical detecting means and from said second optical detecting means.

9. A pickup arm controlling apparatus according to claim 7, wherein:
- said first counter means is initialized to its reset state upon its receipt of an operating signal from said reproduction-start operating means; and
- said second counter means is operative so that said sequential numbers of non-recorded portions are set on basis of number of times of generations of the operating signals delivered from said reproduction-start operating means, and is initialized to its reset state upon its receipt of an operating signal from a reproduction-stop operating means.

10. A pickup arm controlling apparatus according to claim 1, further comprising:
- pickup arm lifter up/down position detecting means for detecting whether the pickup arm lifter is in its uplifted or lowered position, to thereby deliver its detection signal to said pickup arm horizontal controlling means and to said pickup arm lifter controlling means.

11. A pickup arm controlling apparatus according to claim 10, wherein:
- said pickup arm horizontal controlling means outputs a pickup arm lead-in command signal upon its receipt of an operating signal from said reproduction-start operating means during a period when it is applied with an up-position detection signal from said pickup arm lifter up/down position detecting means; and
- said pickup arm lifter controlling means causes the pickup arm lifter to be lowered of its down position to thereby cause the pickup arm to descend upon receipt of a detection signal from said lead-in position detecting means when applied with an up-position detection signal from said pickup arm lifter up/down position detecting means.

12. A pickup arm controlling apparatus according to claim 11, wherein:
- said pickup arm horizontal controlling means outputs a return command signal upon its receipt of an operating signal from a reproduction-stop operating means when applied with a down-position detection signal from said pickup arm lifter up/down position detecting means; and
- said pickup arm lifter controlling means elevates said pickup arm lifter to thereby raise the pickup arm upon receipt of an operating signal from said reproduction-stop operating means when applied with a down-position detection signal from said pickup arm lifter up/down position detecting means.

13. A pickup arm controlling apparatus according to claim 1, wherein:
- said pickup arm reversing controlling means is arranged so that said preset time for outputting a reversed run command signal is variable.

14. A pickup arm controlling apparatus according to claim 13, wherein:
- said pickup arm reversing controlling means comprises:
- time constant circuit means comprised of a capacitor adapted to be charged up upon generation of a lead-in output and discharged upon a cease of generation of this lead-in output, and a resistor connected in series with said capacitor, wherein:
- a voltage across said resistor serves as a reversing command signal.

15. A pickup arm controlling apparatus according to claim 14, wherein:
- said resistor is connected to the ground side.

16. A pickup arm controlling apparatus according to claim 15, wherein:
- said time constant circuit means has a charge-up time constant greater than a discharge time constant.

17. A pickup arm controlling apparatus according to claim 14, wherein:
- said resistor is comprised of a variable resistor.

18. A pickup arm controlling apparatus according to claim 16, wherein:
- said time constant circuit means comprises another resistor connected in series to said capacitor, and
- a diode is connected in parallel to said another resistor for inhibiting a flow thereto of a charge-up current.

19. A pickup arm controlling apparatus according to claim 1, further comprising:
- pickup arm manual operating means comprising a first manual operating means for moving the pickup arm toward a center of the disk in an uplifted position, and a second manual operating means for moving the pickup arm in a direction away from the center of the disk in an uplifted position; and pickup arm manual controlling means for moving the pickup arm upon receipt of an operating signal from said pickup arm manual operating means.

20. A pickup arm controlling apparatus according to claim 19, wherein:

said pickup arm reversing controlling means is rendered inoperative upon generation of an operating signal from said pickup arm manual operating means.

21. A pickup arm controlling apparatus according to claim 19, wherein:

said first and second manual operating means are each provided with a high-speed and a low-speed operating section.

22. In a disk player such as an audio record player or a video disk player which plays disks containing recorded portions and unrecorded portions, said disk player including a pickup arm which is automatically driven in a first direction radially with respect to the disk to position the arm at a selected unrecorded portion of the disk, the improvement wherein the disk player includes reversing means for automatically driving the pickup arm radially with respect to the disk in a direction opposite to the first direction by a preset distance after the cessation of driving the pickup arm in the first direction thereby to compensate for the pickup arm overrunning the selected unrecorded portion of the disk.

23. A pickup arm controlling device for use in a disk player such as an audio record player or a video disk player which plays a disk containing recorded portions and unrecorded portions, comprising:

arm lifting means for raising and lowering a pickup arm of the disk player with respect to a disk on the player;

arm driving means for driving the pickup arm radially with respect to the disk while the arm is lifted;

detection means for detecting when the pickup arm has moved in a first direction to a selected unrecorded portion of the disk and halting the driving of the arm in response to said detection; and reversing control means for causing the driving means to drive the arm radially in a second direction opposite to the first direction by a preset amount to compensate for the arm overrunning the selected unrecorded portion of the disk after the halting of the driving of the arm in the first direction.

* * * * *